United States Patent
Fang et al.

(10) Patent No.: US 11,070,512 B2
(45) Date of Patent: Jul. 20, 2021

(54) SERVER PORT VIRTUALIZATION FOR GUEST LOGICAL UNIT NUMBER (LUN) MASKING IN A HOST DIRECT ATTACH CONFIGURATION

(71) Applicant: INTERNATIONAL BUSINESS MACHINES CORPORATION, Armonk, NY (US)

(72) Inventors: Min Fang, Shanghai (CN); Qing Wang, Wuxi (CN); Wei Yin, Shanghai (CN); Jiang Yu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 351 days.

(21) Appl. No.: 15/429,310

(22) Filed: Feb. 10, 2017

(65) Prior Publication Data
US 2018/0234384 A1 Aug. 16, 2018

(51) Int. Cl.
*H04L 29/12* (2006.01)
*H04L 29/08* (2006.01)
*G06F 13/40* (2006.01)

(52) U.S. Cl.
CPC ...... *H04L 61/1511* (2013.01); *G06F 13/4022* (2013.01); *H04L 61/6004* (2013.01); *H04L 61/6045* (2013.01); *H04L 67/1097* (2013.01)

(58) Field of Classification Search
CPC ............. H04L 61/1511; H04L 61/6004; H04L 61/6045; H04L 67/1097; G06F 13/4022

USPC ......................................................... 709/245
See application file for complete search history.

(56) References Cited

U.S. PATENT DOCUMENTS

| | | | |
|---|---|---|---|
| 8,090,908 B1 | 1/2012 | Bolen et al. | |
| 8,230,153 B2 | 7/2012 | El Zur | |
| 8,706,905 B1 | 4/2014 | McGlaughlin | |
| 2003/0131182 A1* | 7/2003 | Kumar | G06F 3/0601 711/5 |
| 2010/0122111 A1* | 5/2010 | Allen | G06F 11/2005 714/3 |
| 2012/0210416 A1* | 8/2012 | Mihelich | H04L 63/0218 726/11 |
| 2014/0119371 A1* | 5/2014 | Desai | H04L 49/357 370/392 |
| 2014/0297782 A1* | 10/2014 | Umbehocker | G06F 3/0622 709/216 |
| 2015/0261706 A1* | 9/2015 | Kuch | G06F 9/44505 710/104 |
| 2015/0358254 A1* | 12/2015 | Zheng | H04L 49/357 370/355 |

(Continued)

*Primary Examiner* — Hamza N Algibhah
*Assistant Examiner* — Tony Williams
(74) *Attorney, Agent, or Firm* — Griffiths & Seaton PLLC

(57) ABSTRACT

Embodiments for server port virtualization for guest logical unit number (LUN) masking in a host direct attach configuration using a storage adapter in a computing environment by a processor. An F switch port is simulated by an N storage port to enable either N-port virtualization (NPV) or N-port identification (ID) virtualization (NPIV) in the host direct attach configuration by directly attaching the N server port to the N storage port. A domain name system (DNS) operation is performed to cause each virtualized N-port ID to be mapped to fiber channel (FC) IDs in domain format of domain, area, port.

12 Claims, 8 Drawing Sheets

(56) References Cited

U.S. PATENT DOCUMENTS

| | | | |
|---|---|---|---|
| 2016/0191299 A1* | 6/2016 | Shiraki | H04L 49/357 370/408 |
| 2016/0205008 A1* | 7/2016 | Dasu | H04L 43/0888 709/224 |

* cited by examiner

485

Switch attached FLOGI and PLOGI process:

495

N-port to N-port direct attached connection login work

SERVER PORT VIRTUALIZATION FOR GUEST LOGICAL UNIT NUMBER (LUN) MASKING IN A HOST DIRECT ATTACH CONFIGURATION

BACKGROUND OF THE INVENTION

Field of the Invention

The present invention relates in general to computing systems, and more particularly to, various embodiments for server port virtualization for guest logical unit number (LUN) masking in a host direct attach configuration using a storage adapter in a computing environment using a computing processor.

Description of the Related Art

Computing systems may be found in the workplace, at home, or at school. Computer systems may include data storage systems, or disk storage systems, to process and store data. A storage system may include one or more disk drives, which may be configured in an array, such as a Redundant Array of Independent Disks (RAID) topology. In a RAID system, data is stored redundantly across multiple disks in a variety of configurations to provide data security in the event of a hardware or software failure.

As the technology field grows exponentially each year and ever-growing amounts of critical data are stored on storage systems, the need to facilitate access to and store such data becomes increasingly paramount. Consequently, the need for advancement in the data storage field is of great precedence.

SUMMARY OF THE INVENTION

Various embodiments for server port virtualization for guest logical unit number (LUN) masking in a host direct attach configuration using a storage adapter in a computing environment by a processor, are provided. In one embodiment, by way of example only, a method for server port virtualization for guest logical unit number (LUN) masking in a host direct attach configuration using a storage adapter in a computing environment, again by a processor, is provided. An F switch port is simulated by an N storage port to enable either N-port virtualization (NPV) or N-port identification (ID) virtualization (NPIV) in the host direct attach configuration by directly attaching the N server port to the N storage port. A domain name system (DNS) operation is performed to cause each virtualized N-port ID to be mapped to fiber (or "fibre") channel (FC) IDs in domain format of domain, area, port (e.g., domain:area:port or "dd:aa:pp").

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
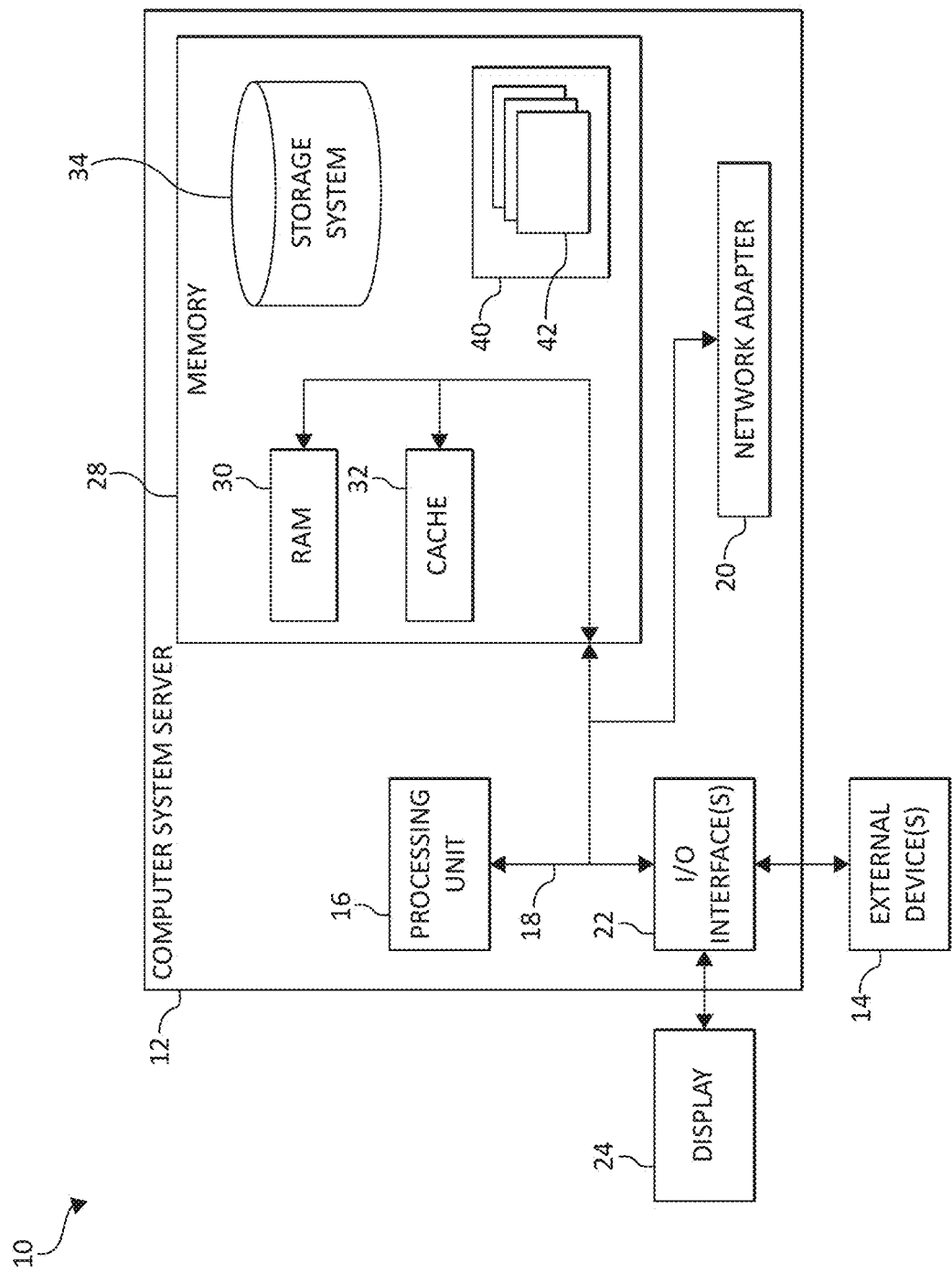
FIG. 1 is a block diagram depicting an exemplary cloud computing node according to an embodiment of the present invention.

Storage networks, such as a SAN, are network architectures used to connect servers (also referred to herein as "host systems") to storage systems such as disk arrays, tape libraries, and the like. A storage network may include a logical unit number (LUN) which may be an entire physical disk, or a subset of a larger physical disk or disk volume. The physical disk or disk volume may be an entire single disk drive, a partition (subset) of a single disk drive, or a disk volume from a redundant array of independent disks (RAID) controller comprising multiple disk drives aggregated together for larger capacity and redundancy. In one aspect, a LUN may assist in managing block storage arrays shared over a SAN. In an additional aspect, a LUN may represent a logical abstraction, or rather, a virtualization layer between a physical disk device/volume and one or more applications.

Fibre Channel (FC) is the general name of an integrated set of standards being developed by the American National Standards Institute (ANSI). In Fibre Channel terms the switch connecting the devices is called Fabric. The link may be two unidirectional fibres transmitting to opposite directions with their associated transmitter and receiver. Each fibre may be attached to a transmitter of a port at one end and a receiver of another port at the other end. When a Fabric is present in the configuration, the fibre may attach to a node port (N_Port) and to a port of the Fabric (F_Port). The topology may be selected depending on system performance requirements or packaging options. Possible FC topologies include point-to-point, crosspoint switched or arbitrated loop.

At the heart of any Fibre Channel functionality is the switching equipment that connects the host servers with the storage systems. The switching equipment may perform basic connectivity between FC devices and can also determine the type of FC devices that are connected, handle FC zoning function, and typically allow connections to other Fibre Channel switches to extend the storage network. A feature of a network having fibre channel functionality is the fabric or switch. The fabric connects two devices with connections called links. Each device has at least an N_port or node port. A device attaches to the fabric by matching the associated N_port (or N port) to a corresponding F_port on the fabric. The F_port (or F port) is a fabric port, and may be located on the switch. Accordingly, a link may be terminated to an N_port and to a matching F_port. A common device attached at the N_port side of a link is a Host Bus Adapter (HBA). A Host Bus Adapter is a device that connects a host or computer to other network or storage devices. The HBA may connect, for example, to SCSI, Fibre Channel and eSATA devices, among others.

N_Port ID Virtualization (NPIV) is a fibre channel industry standard technology that provides the capability to assign a physical fibre channel HBA port to multiple unique world wide port names (WWPNs). The world wide port names can then be assigned to multiple initiators such as Operating Systems. Thus, NPIV allows physical Port to be logically partitioned into multiple logical ports and/or Fibre Channel (FC) addresses so that a physical HBA can support multiple initiators, each with a unique N_Port ID.

From a SAN perspective, a NPIV HBA with multiple WWPNs configured would appear to be multiple WWPNs. Such WWPNs may be from an indeterminate number of host nodes and an indeterminate number of HBAs. From the host side, the NPIV HBA may also support multiple WWPNs corresponding, as a group, to a single host node and HBA. NPIV may support the Virtual I/O Server (VIOS) provisioning of dedicated logical ports to client LPARs rather than individual LUNs. Each client partition with an NPIV logical port may operate as though the client partition has its own dedicated FCP adapter(s).

NPIV may also be used in hypervisor operating systems (OS) and enterprise level server hardware, but is a default configuration requirement by the server OS. Using port virtualization, each guest OS (GOS or "gos") may have a virtualized WWPN assigned. The gos may have dedicated LUNs assigned from storage systems with LUN masking via that WWPN and all guests sharing the same server adapter HW can utilize the adapter better when the adapter is at high speed. Currently port virtualization requires switch hardware between server and storage. However, some systems may require attaching storage systems directly to one or more servers. While some server hardware may provide port virtualization basic requirements, some power servers with PowerVM (or "advanced power virtualization") and other types of servers may require NPIV to improve adapter hardware utilization rate and enhance guest IO performance. Thus, enabling NPV or NPIV in host direct attach configuration is a current challenge. A need therefore exits that provides a solution to automatically handle server adapter ports with NPIV/PIV and without virtualization.

In one embodiment, by way of example only, the present technology provides for server port virtualization for guest logical unit number (LUN) masking in a host direct attach configuration using a storage adapter in a computing environment, again by a processor. An F switch port is simulated by an N storage port to enable either N-port virtualization (NPV) or N-port identification (ID) virtualization (NPIV) in the host direct attach configuration by directly attaching the N server port to the N storage port. A domain name system (DNS) operation is performed to cause each virtualized N-port ID to be mapped to fibre channel (FC) IDs in a domain format of domain, area, port (e.g., domain:area:port or "dd:aa:pp").

That is, to support NPIV/PIV, a DNS operation is provided with a switch configuration of N-port to F-port and F-port to N-port. A host port and storage port may both be an N-port while the switch port may be an F-port. A host direct attach configuration may be an N_Port to N_Port attachment configuration. Thus, the switch F-port may be simulated by the N_Port and a DNS function may be performed to map each virtualized N_Port identifier (IDs) to FC IDs in a format of domain, area, port (or "DD:AA:PP").

To further illustrate, the present invention provides an improved storage adapter to support server side HBA port virtualization and/or NPIV for server guest level LUN masking, and automatically handles server adapter port with NPIV/PIV and server adapter port without virtualization. The present invention provides for enabling NPV or NPIV in host direct attach configuration. In current switched configuration, the connection is N_port (server port) to F_port (switch port), Zoning, and F_port (switch port) to N_port (storage port). The host port and storage port may both be N_port, while switch port may be the F_port. In a direct attach configuration, the connection is N_port (server port) to N_port (storage port). Thus, the present technology enables the storage port (N_port) to simulate a switch F_port and storage firmware may implement a DNS function to map each virtualized N_port ID to FC IDs in a format of DD:AA:PP (Domain:Area:Port).

Second, the present invention enables the FC protocol to define F-login and P-login processes and define ports of different types having different behaviors. That is, the Fiber Channel protocol defines F-login and P-login processes, ports of different types have different behaviors that may be depicted as described in FIGS. 4B and 4C. The improved storage adapter solution recognizes one or more target ports and then has different processes to handle different target host ports, then host and storage can automatically attach to each other in various configurations without any additional port type change or configuring through storage or server management software, which may require some downtime. The improved storage adapter solution processes may include 1) a normal switch attached login process; 2) without NPIV's N_Port-to-N_Port direct attached login process; and/or 3) With NPIV's N_Port-to-N_Port direct attached login process.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

In one aspect, computer system/server 12 may be a direct attached storage (DAS) system configurable to simultaneously implement a plurality of data storage schemes, comprising one or more storage devices, a controller (not shown for illustrative convenience) coupled to the storage devices, such as storage system 34, for implementing and managing a plurality of data storage schemes on the storage devices, an I/O port, such as I/O interfaces 22 (e.g., N_Port) for inputting data to and outputting data from the storage devices, and an apportionment selector coupled to the controller for selecting a portion of the storage devices to be allocated to a determined data storage scheme.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
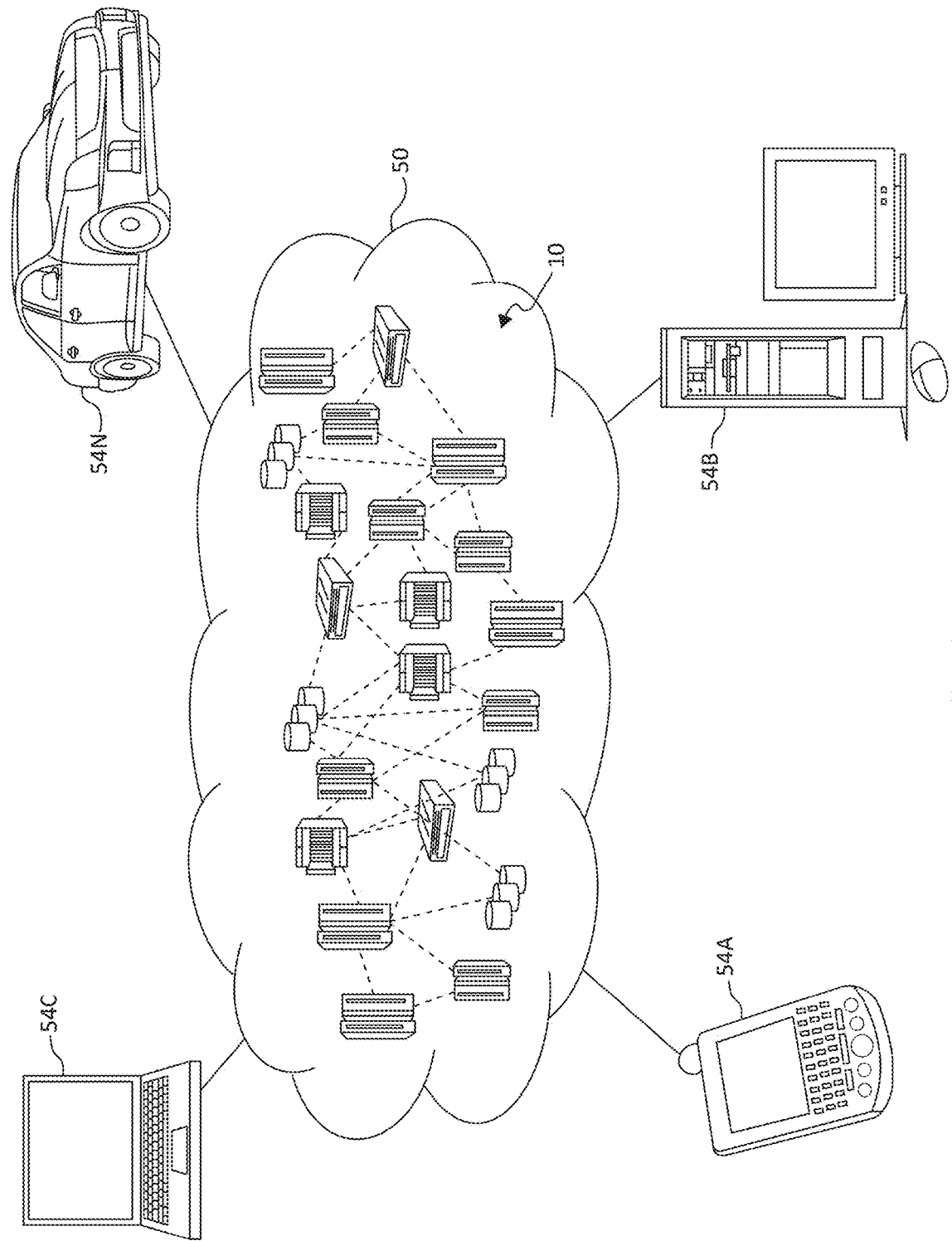
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
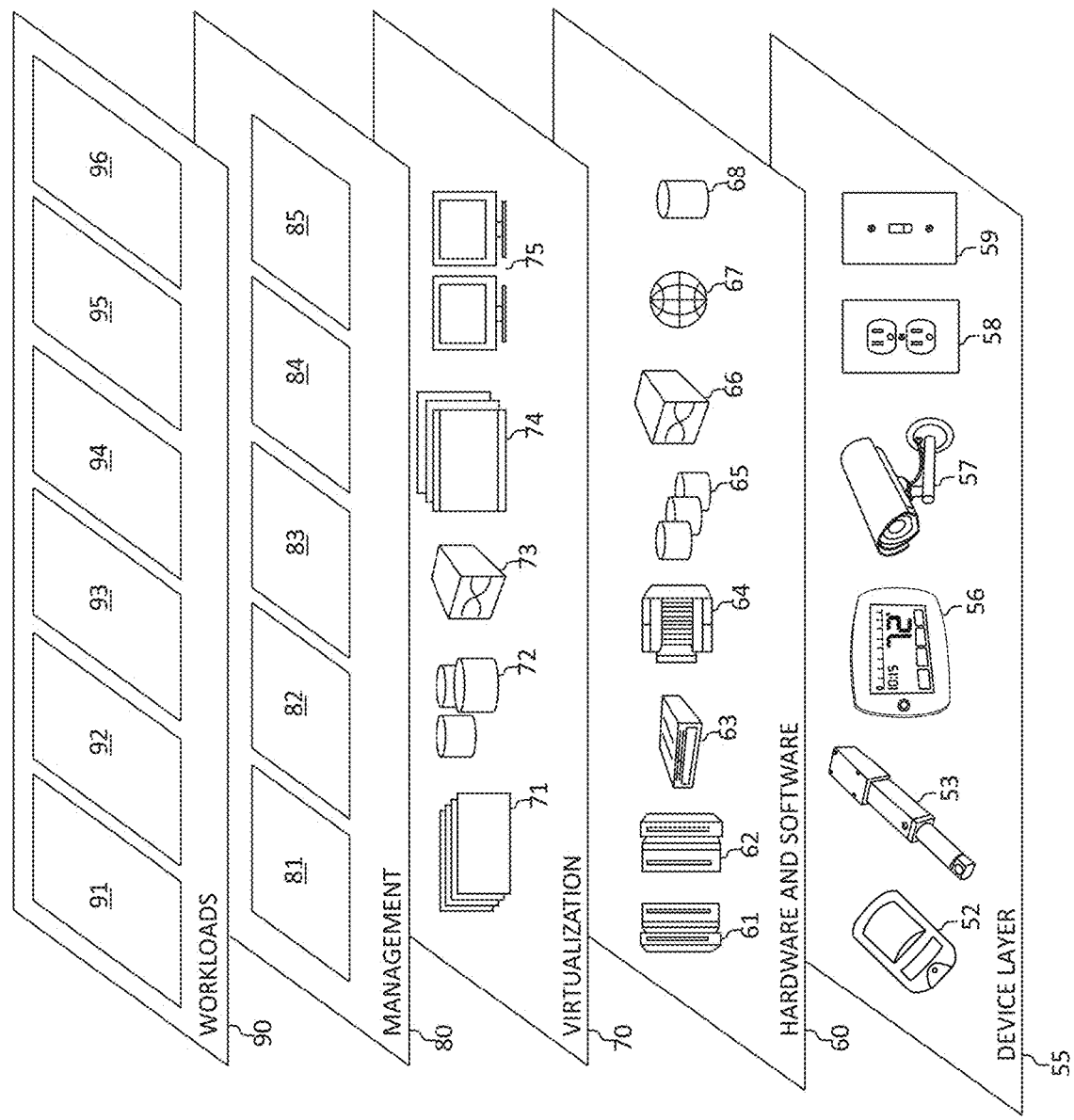
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various server port virtualization for guest LUN masking workloads and functions 96. In addition, server port virtualization for guest LUN masking workloads and functions 96 may include such operations as data analytics, data analysis, and as will be further described, notification functionality. One of ordinary skill in the art will appreciate that the server port virtualization for guest LUN masking workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4A:
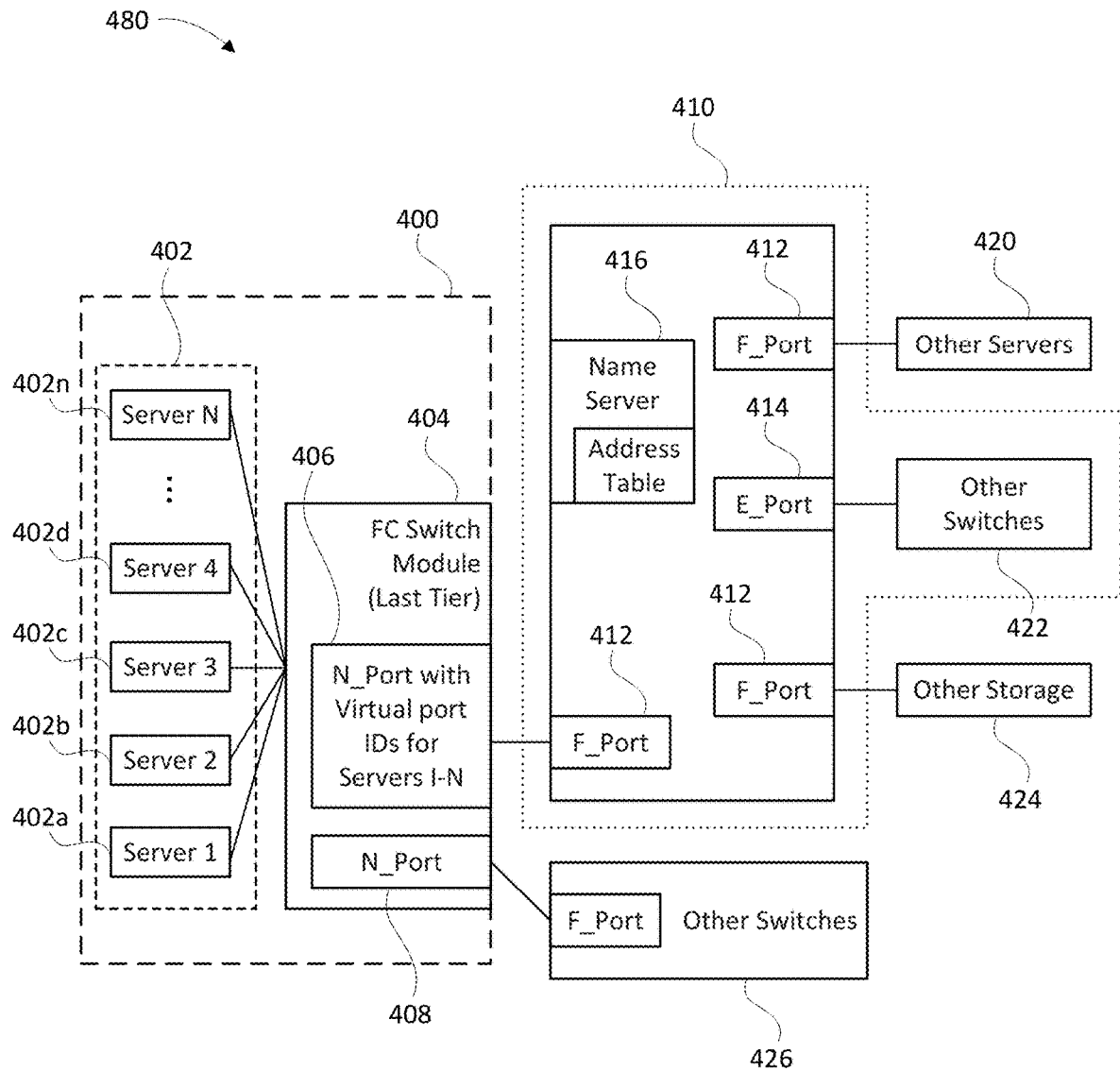
FIG. 4A is an additional block diagram depicting exemplary data communications network configured with an FC Switch programmed to obtain multiple port identifications directly from a SAN fabric according to an embodiment of the present invention.

Turning now to FIG. 4A, a block diagram illustrating a data communications network configured with an FC Switch Module programmed to obtain multiple port identifications (N_Port ID) directly from a SAN fabric. As shown in FIG. 4A a data processing network 480 can include a server chassis 400 which can be, for instance, a BladeCenter™ Server Chassis manufactured by International Business Machines Corporation of Armonk, N.Y., United States. The server chassis 400 can include multiple server computing devices 402a-402n and a FC Switch Module 404, however, the multiple server computing devices 402a-402n and the FC Switch Module 404 can be standalone system components and reside outside the server chassis 400 either separately or in combination.

Each server 402 communicates with the FC Switch Module 404 through host bus adapters, for instance a blade HBA, as it is well known, and is connected to the FC Fabric 410 by the FC Switch Module 404 with the FC Fabric 410 being connected to one or more other network devices, for example other servers 420, other switches 422 and other storage 424. Optionally, the FC Switch Module 404 can also connect, even simultaneously, via another external port 408 to the same fabric, or to another fabric, network device, or FC switch 426. Each port on the FC Switch Module 404 can be configured to use NPIV port mode, or not. Optionally, the servers 402 may be allowed to access all connected FC devices, or may be configured to limit access to specific devices or through specific ports.

The FC Switch Module 404 is, in the exemplary embodiment, hardware having a software interface for communicating with the multiple servers 402, and includes an N_Port 406 for connecting to an F_Port 412 of the fabric 410. Although a single port, the N_Port 406 recognizes multiple addresses (N_Port IDs), for example, one address for each of the servers 1-n (402a-402n). Once the N_Port ID address for a server 402 is established, communication by another network device (e.g., other servers 420, other switches 422, other storage 424, via E_Port 414, etc.) to that particular server 402 can be effected by communicating with the server's assigned N_Port ID address. A name server 416 is provided in the fabric 410 that includes an address table.

This address table includes, among other things, an identification of each server 402, for instance its World Wide Name (WWN), and its corresponding N_Port ID address. Thus, in order to communicate with a server 402, the name server 416 can be accessed to determine the N_Port ID address corresponding to that server 402, and data is then sent to that N_Port ID address. It will be understood that each F_Port 412 in the fabric 410 acts to receive and transmit data and commands between the fabric 410 and the FC Switch Module 404 or a network device (e.g., other servers 420, other switches 422, other storage 424, etc.), as is known in the art.

The FC Switch Module provides an N_Port ID Virtualization "NPIV" mode support which allows a physical FC port (N_Port) to log into a SAN fabric multiple times, and to receive a unique N_Port ID each time. Accordingly, the physical FC Switch Module port (N_Port) can act as multiple logical N_Ports. More specifically, NPIV provides an operational mode for an external port of an FC switch that will allow it to connect to a SAN fabric as a node port (N_Port), and to establish virtual ports (N_Port IDs) for itself and for each server computing device, for instance, servers 402 or the corresponding host bus adapter (HBA), that connects to the FC Switch Module. The connected fabric port 412 can provide NPIV support in the form of a login response mechanism that provides multiple N_Port IDs in response to multiple requests. When utilizing NPIV, only the interconnected node port (N_Port) of the FC Switch Module 404 and fabric port (F_Port) of the fabric 410 will have any awareness of the virtualization occurring.

Figure 4B:
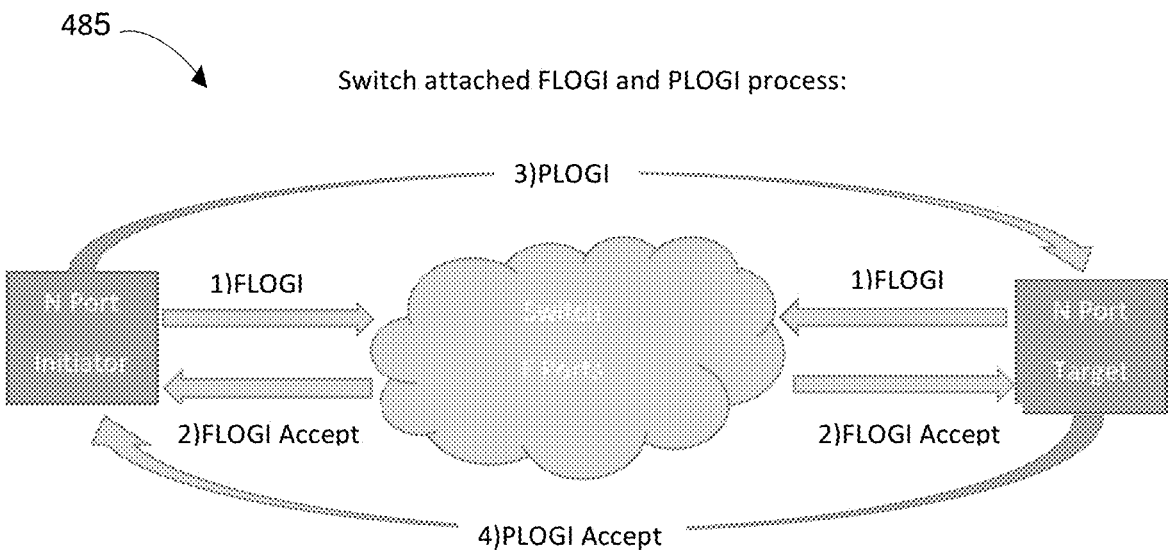
FIG. 4B is an additional block diagram depicting an exemplary switch attached FLOGI and PLOGI process according to an embodiment of the present invention.
Figure 4C:
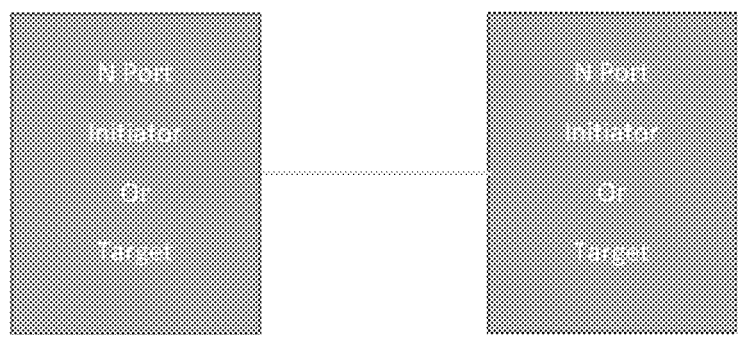
FIG. 4C is an additional block diagram depicting exemplary N-Port to N-Port direct attached connection login work process according to an embodiment of the present invention.

Turning now to FIGS. 4B and 4C, a normal or "standard" switch attached FLOGI and PLOGI process 485 and an N-Port to N-Port direct attached connection login work process 495 is depicted. As illustrated in FIG. 4B, before either of two N_Ports (e.g., an N_Port Initiator and N_Port Target) can communicate with each other, a login relationship with their (e.g., an N_Port Initiator and N_Port Target) related F_Ports may be established, which may be called FLOGI (fabric login). Based on the completed FLOGI process, the two N_Ports must continue with the PLOGI (port login) to exchange each side's capabilities, limitations and operating parameters. These two login processes guarantee the frames exchange and the communication between the N_Ports.

For N-port to N-port direct attached connection login work, as depicted in FIG. 4C, when two N_Ports (e.g., Initiator and Target) are connected to each other directly, both ports first send a FLOGI to each other, and two N_Ports (e.g., Initiator and Target) may determine that they are connected directly to an N_Port by examining a bit from the FLOGI. While differentiating with switch attached connection, an N-N PLOGI may be sent by the N_Port that has a larger world wide port name (WWPN) value. A port may determine if the port has the larger WWPN by comparing its WWPN against the WWPN of the attached N_Port. This may be defined in FC protocol.

Figure 5:
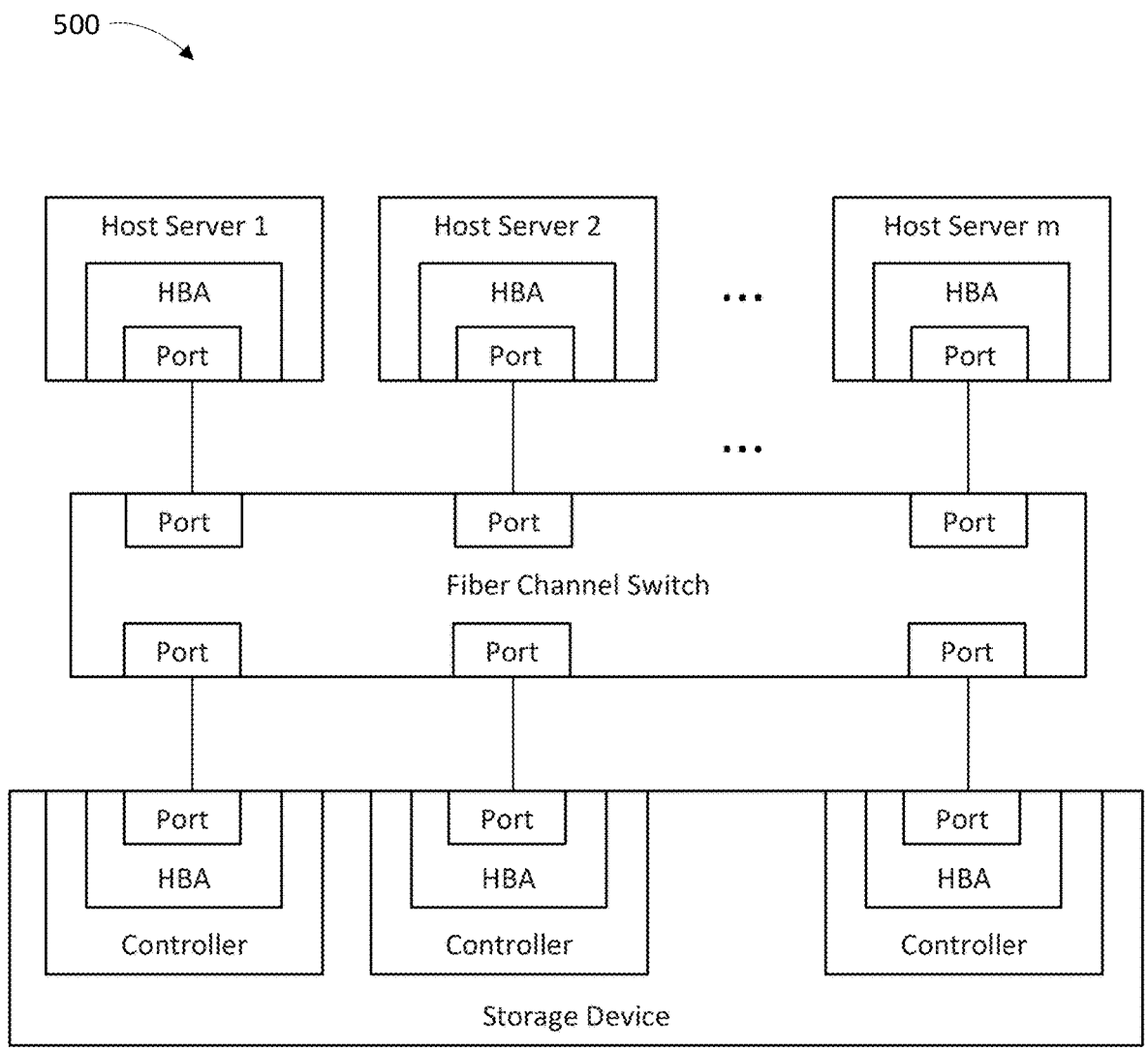
FIG. 5 is an additional block diagram depicting exemplary storage area network (SAN) architecture according to an embodiment of the present invention.

FIG. 5 schematically illustrates a block diagram of the architecture of SAN. According to FIG. 5, a plurality of host servers are coupled to a disk array through a Fibre Channel switch. The Fibre Channel coupling is a high bandwidth backbone to satisfy a sharing storage environment in SAN (connectors like a relay network possibly exist there between, which are not illustrated in FIG. 5). In the Fibre Channel, a host bus adaptor (HBA) card may be a physical connection device between an I/O channel inside a host server and an I/O channel of a storage system. With an HBA card inserted, a server (host server) and/or storage server may be coupled to a disk supporting an FC via an FC switch.

All communications may be performed via the HBA card at the host server, the Fiber (or "Fibre") Channel switch, and a corresponding Fiber Channel port on the storage device. A port (N port) of the host server may be coupled to a port (F port) of the Fiber Channel switch and the port (F port) of the Fiber Channel switch is coupled to a port (N port) of a storage device via Fiber Channel so as to form a physical data link. However, FC protocol criteria may allow one N port (N_Port) to obtain a plurality of FC IDs from a Fiber Channel fabric, such that it is possible to establish a plurality of independent logic data links between a node and a Fiber Channel switch. In SAN, servers at different platforms may access the same storage device or a plurality of storage devices. SAN enables storage devices not to be affiliated to a certain server any more, but to be directly connected to the network to form a storage area network, thereby improving the utilization efficiency of storage. Storage controllers of the storage subsystem in FIG. 5 control data transfer and access on the storage device and are generally divided into two parts: a front end and a back end. The front end of the storage controller is to communicate with a host, a Fiber Channel switch, or other device via one or more ports, while the back end is for inter-communication with the disk array under its management. To improve performance and reliability, a storage subsystem may have one or more storage controllers. As illustrated in FIG. 5, each host server is coupled to the disk array via a single physical path; therefore, an error of single-point coupling failure may easily occur.

However, since some systems require attaching storage systems directly to one or more servers or other types of servers require NPIV to improve adapter hardware utilization rate and enhance guest IO performance, enabling NPV or NPIV in host direct attach configuration is a current challenge. Thus, the present technology provides a solution on the storage side which provides improvement of handling host side NPIV in direct attach configurations and also automatically handles the FLOGI/PLOGI process per the peer host/switch port type, as depicted in FIG. 7 (such as for example steps 724 and 726 of FIG. 7).

In one aspect, the present invention provides an improved host storage adapter (HSA) solution for server port virtualization for guest LUN masking in a host direct attach storage configuration environment. More specifically, the present invention provides for enabling N port virtualization (NPV) or N port ID virtualization (NPIV) in host direct attach configuration by directly attaching N-port (server port) to N-port (storage port) with storage port simulating switch port (F-port) and implementing domain name system (DNS) function to map each virtualized N-port ID to fiber channel (FC) IDs in Domain:Area:Port (DD:AA:PP) format, as depicted in FIG. 7.

Figure 6:
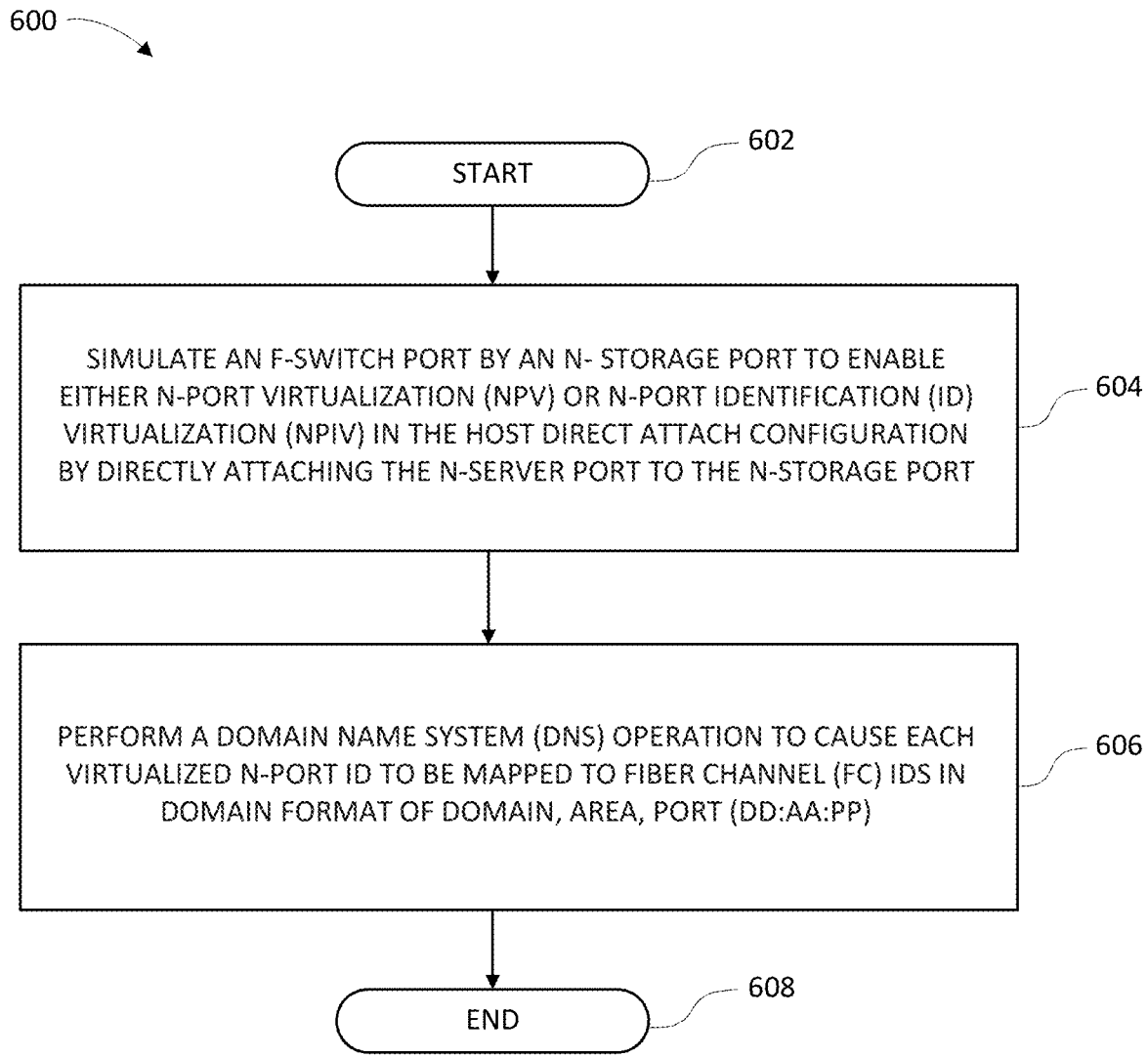
FIG. 6 is an additional flowchart diagram depicting an additional exemplary method for server port virtualization for guest logical unit number (LUN) masking in a host direct attach configuration using a storage adapter in a computing environment by a processor, again in which aspects of the present invention may be realized.

Turning now to FIG. 6, a method 600 for server port virtualization for guest logical unit number (LUN) masking in a host direct attach configuration using a storage adapter in a computing environment by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start, as in block 602. An F switch port may be simulated by an N storage port to enable either N-port virtualization (NPV) or N-port identification (ID) virtualization (NPIV) in the host direct attach configuration by directly attaching the N server port to the N storage port, as in block 604. A domain name system (DNS) operation is performed to cause each virtualized N-port ID to be mapped to fiber channel (FC) IDs in domain format of domain, area, port, as in block 606. The functionality 600 may end in block 608.

Figure 7:
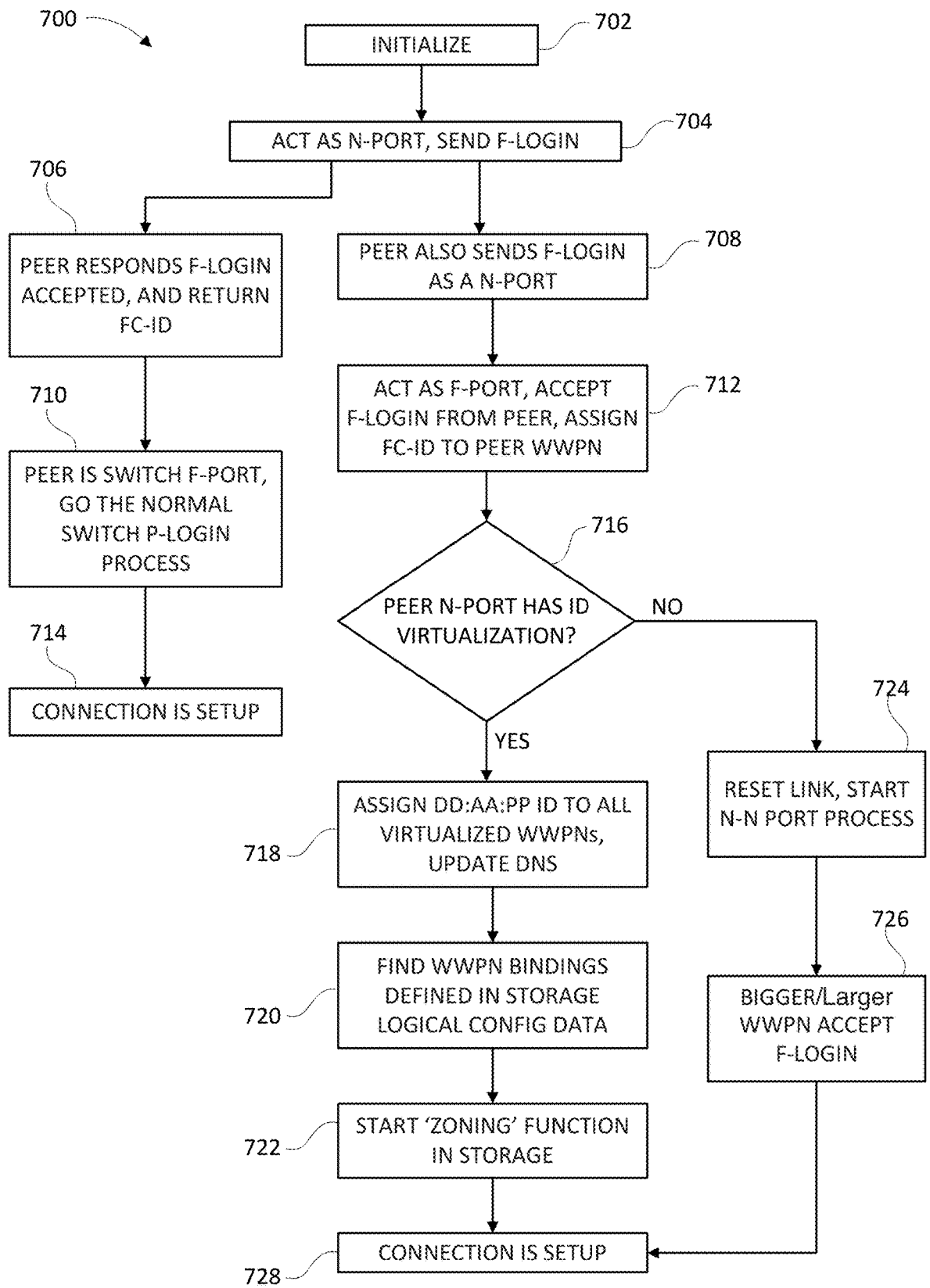
FIG. 7 is an additional flowchart diagram depicting an additional exemplary method for server port virtualization for guest logical unit number (LUN) masking in a host direct attach configuration using a storage adapter in a computing environment by a processor, again in which aspects of the present invention may be realized.

Turning now to FIG. 7, a method 700 for server port virtualization for guest logical unit number (LUN) masking in a host direct attach configuration using a storage adapter in a computing environment by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start ("initialize") as in block 702. An F-login (e.g., fabric login or "flogi") may be sent by a host bus adapter (HBA) acting as an N-port, as in block 704. In parallel and/or in sequentially, the functionality 700 may receive an F-login accept message and a FC-ID from a peer node, as in block 706 and/or receive an F-login as an N-port from the peer node, as in block 708. From block 706, a switch P-login process may be performed when the peer node is a switch F-port, as in block 710, and connection setup is then complete, as in block 714.

From block 708, when the F-port is simulated by an N storage port, the F-login received from the peer node may be accepted and a FC-ID may be assigned to a peer world wide port name (WWPN), as in block 712. A determination operation may be performed to determine if the peer N-port has an ID virtualization, as in block 716. If yes, the functionality may move to block 718. If no, the functionality may move to block 724. If yes, a domain format of "DD:AA:PP" (domain, area, port) ID may be assigned to each virtualized WWPN and a domain name system (DNS) may be updated, as in block 718. From block 718, all WWPN bindings that are defined in logical configuration data (in storage) may be identified and/or located, as in block 720. A zoning function operation may start or commence in storage, as in block 722. The functionality 700 may then move from block 722 to block 728.

Returning now to block 716, if "No", an N to N ("N-N") port process may start and a link may be reset, as in block 724. That is, the link means connections between two N-ports here. Reset link may be one of the steps of port initialization and may occur before login process, as described in FIGS. 4B-4C. A bigger/larger WWPN F-login may accept F-login, as in block 726. From block 726, a connection operation may be setup and/or complete, as in block 728. The FC protocol may define a rule about which side should initiate and continue P-login in a N-to-N port direct attached connection. The bigger/larger WWPN means a WWPN having a larger WWPN value.

In one aspect, in conjunction with and/or as part of at least one block of FIGS. 6-7, the operations of methods 600 and/or 700 may include each of the following. The operations of method 600 and/or 700 may assign the domain format of domain, area, port to each virtualized WWPN. A fabric login (FLOGI) may be sent to a peer host by the N storage port simulating the F switch port. The operations of method 600 and/or 700 may also receive from the peer host a FLOGI acceptance response along with the FC ID and/or receive from the peer host the FLOGI while acting as the N storage port.

Also, the operations of method 600 and/or 700 may accept the FLOGI acceptance response from the peer host and assign the FC-ID to a peer world wide port name (WWPN) while simulating the F switch port. The WWPN bindings defined in logical configuration data in storage may be identified and/or located. A zoning operation may start in one or more direct attach storages. Each of the virtualized N-port IDs may be mapped to the FC IDs in the domain format of domain, area, port (e.g., "DD:AA:PP")

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for server port virtualization for guest logical unit number (LUN) masking in a host direct attach configuration using a storage adapter in a computing environment, comprising:
   simulating an F switch port by an N storage port of the storage adapter of a storage system to enable either N-port virtualization (NPV) or N-port identification (ID) virtualization (NPIV) in the host direct attach configuration, wherein the host direct attach configuration includes physically attaching an N server port of a host directly to the N storage port of the storage adapter of the storage system without connecting the N server port to the N storage port through an intermediate switching device;
   sending, to a peer host, a fabric login (FLOGI) by the N storage port simulating the F switch port, wherein the FLOGI is received by from the peer host while acting as the N storage port;
   receiving, from the peer host, a FLOGI acceptance response, the FLOGI acceptance response inclusive of a fiber channel (FC) ID assigned to the peer host;
   accepting the FLOGI acceptance response from the peer host; and
   performing a domain name system (DNS) operation, within firmware of the storage system, to cause each virtualized N-port ID to be mapped to the FC-ID in a domain format of domain, area, port, wherein, upon accepting the FLOGI acceptance response from the peer host, the FC-ID is assigned to a peer world wide port name (WWPN) while simulating the F switch port, and wherein upon receiving the FLOGI, the firmware distinguishes and automatically adapts between a standard N port-to-F port FLOGI process using the intermediate switching device, a non-virtualized, direct attach N port-to-N port FLOGI process, and a virtualized, direct attach N-port-to-N port FLOGI process implementing the NPV or NPIV.

2. The method of claim 1, further including assigning the domain format of domain, area, port to each virtualized WWPN.

3. The method of claim 1, further including:
   identifying WWPN binding defined in logical configuration data in the firmware of the storage system; and
   starting a zoning operation in the firmware of the storage system.

4. The method of claim 1, further including mapping each of the virtualized N-port IDs to the FC-IDs in the domain format of domain, area, port.

5. A system for server port virtualization for guest logical unit number (LUN) masking in a host direct attach configuration in a computing environment, comprising:
   one or more computers each having a physical processor and physical memory, the physical memory storing executable instructions that when executed by the processor cause the system to:
   simulate an F switch port by an N storage port of the storage adapter of a storage system to enable either N-port virtualization (NPV) or N-port identification (ID) virtualization (NPIV) in the host direct attach configuration, wherein the host direct attach configuration includes physically attaching an N server port of a host directly to the N storage port of the storage adapter of the storage system without connecting the N server port to the N storage port through an intermediate switching device;
   send, to a peer host, a fabric login (FLOGI) by the N storage port simulating the F switch port, wherein the FLOGI is received by from the peer host while acting as the N storage port;
   receive, from the peer host, a FLOGI acceptance response, the FLOGI acceptance response inclusive of a fiber channel (FC) ID assigned to the peer host;
   accept the FLOGI acceptance response from the peer host; and
   perform a domain name system (DNS) operation, within firmware of the storage system, to cause each virtualized N-port ID to be mapped to the FC-ID in a domain format of domain, area, port, wherein, upon accepting the FLOGI acceptance response from the peer host, the FC-ID is assigned to a peer world wide port name (WWPN) while simulating the F switch port, and wherein upon receiving the FLOGI, the firmware distinguishes and automatically adapts between a standard N port-to-F port FLOGI process using the intermediate switching device, a non-virtualized, direct attach N port-to-N port FLOGI process, and a virtualized, direct attach N-port-to-N port FLOGI process implementing the NPV or NPIV.

6. The system of claim 5, wherein the executable instructions assign the domain format of domain, area, port to each virtualized WWPN.

7. The system of claim 5, wherein the executable instructions:
   identify WWPN binding defined in logical configuration data in the firmware of the storage system; and
   start a zoning operation in the firmware of the storage system.

8. The system of claim 5, wherein the executable instructions map each of the virtualized N-port IDs to the FC-IDs in the domain format of domain, area, port.

9. A computer program product for, by a processor, server port virtualization for guest logical unit number (LUN) masking in a host direct attach configuration using a storage adapter, in a computing environment, the computer program product comprising a non-transitory computer-readable storage medium having computer-readable program code portions stored therein, the computer-readable program code portions comprising:
   an executable portion that simulates an F switch port by an N storage port of the storage adapter of a storage system to enable either N-port virtualization (NPV) or N-port identification (ID) virtualization (NPIV) in the host direct attach configuration, wherein the host direct attach configuration includes physically attaching an N server port of a host directly to the N storage port of the storage adapter of the storage system without connecting the N server port to the N storage port through an intermediate switching device;

an executable portion that sends, to a peer host, a fabric login (FLOGI) by the N storage port simulating the F switch port, wherein the FLOGI is received by from the peer host while acting as the N storage port;

an executable portion that receives, from the peer host, a FLOGI acceptance response, the FLOGI acceptance response inclusive of a fiber channel (FC) ID assigned to the peer host;

an executable portion that accepts the FLOGI acceptance response from the peer host; and an executable portion that performs a domain name system (DNS) operation, within firmware of the storage system, to cause each virtualized N-port ID to be mapped to the FC-ID in a domain format of domain, area, port, wherein, upon accepting the FLOGI acceptance response from the peer host, the FC-ID is assigned to a peer world wide port name (WWPN) while simulating the F switch port, and wherein upon receiving the FLOGI, the firmware distinguishes and automatically adapts between a standard N port-to-F port FLOGI process using the intermediate switching device, a non-virtualized, direct attach N port-to-N port FLOGI process, and a virtualized, direct attach N-port-to-N port FLOGI process implementing the NPV or NPIV.

10. The computer program product of claim 9, further including an executable portion that assigns the domain format of domain, area, port to each virtualized WWPN.

11. The computer program product of claim 9, further including an executable portion that:
    identifies WWPN binding defined in logical configuration data in the firmware of the storage system; or
    starts a zoning operation in the firmware of the storage system.

12. The computer program product of claim 9, further including an executable portion that maps each of the virtualized N-port IDs to the FC-IDs in the domain format of domain, area, port.

* * * * *